March 31, 1931.  F. J. STRAUB ET AL  1,798,504
MEANS FOR PREVENTING BACK MOVEMENT IN MOTOR VEHICLES
Filed Sept. 7, 1927  2 Sheets-Sheet 1
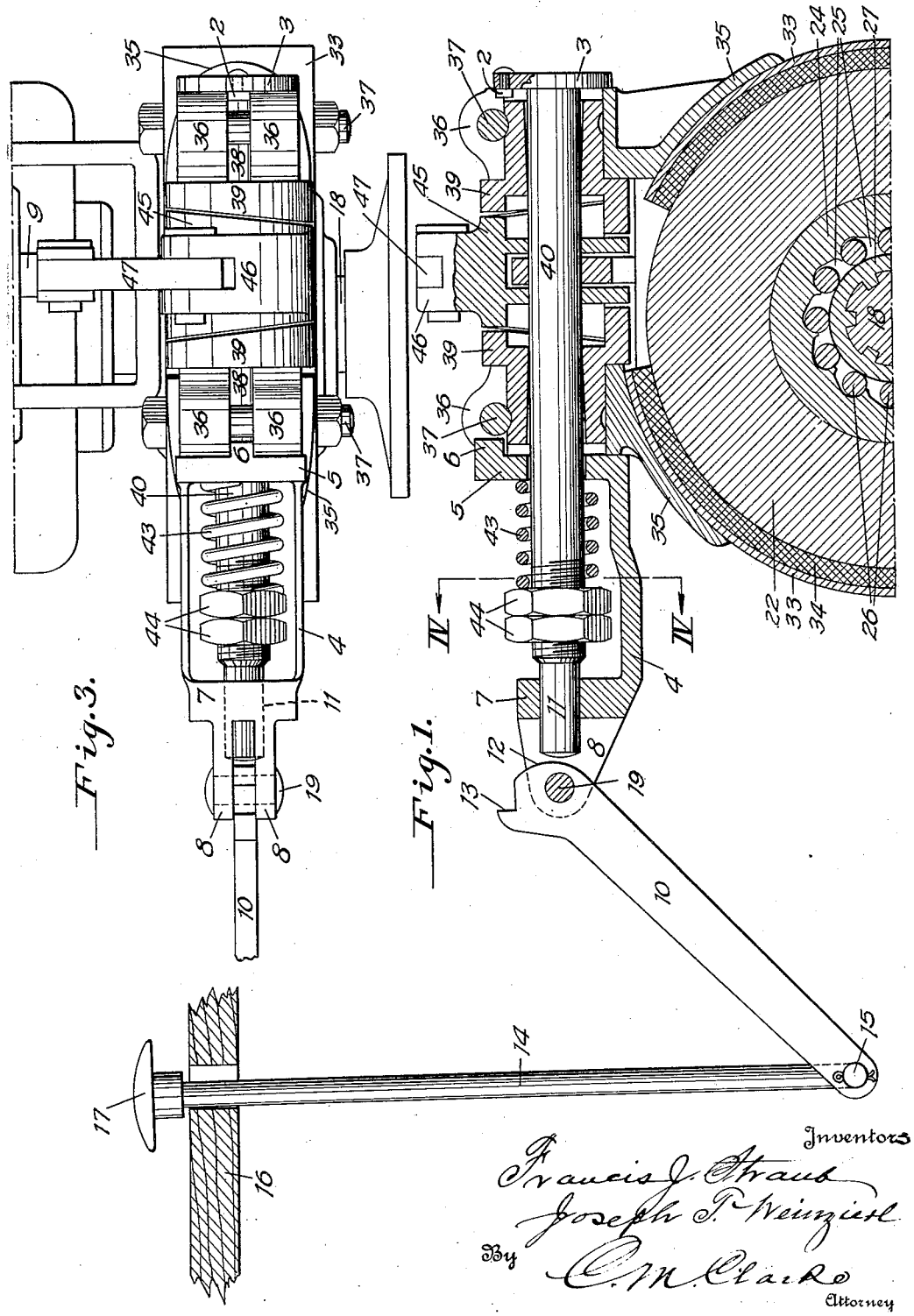

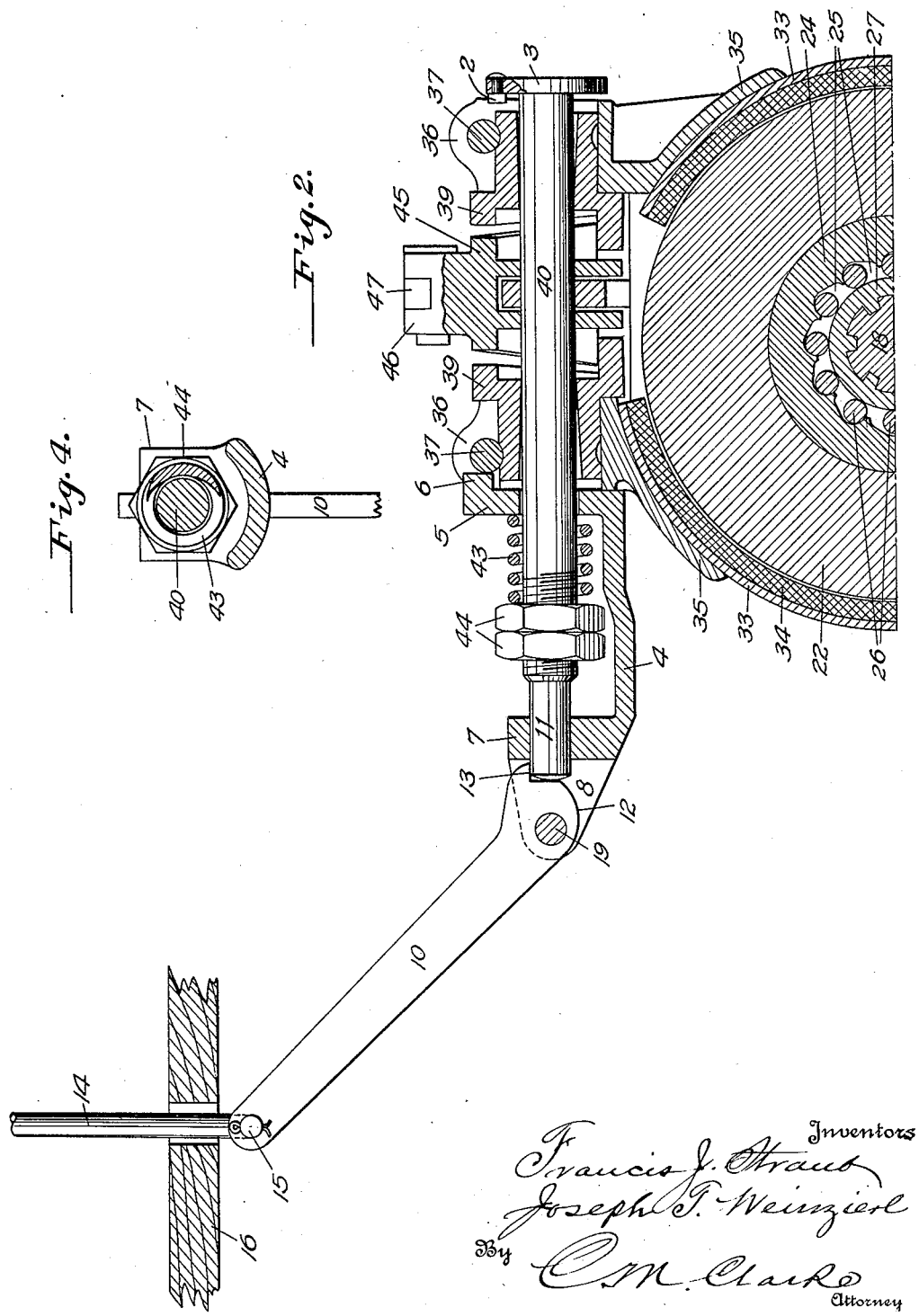

Patented Mar. 31, 1931

1,798,504

UNITED STATES PATENT OFFICE

FRANCIS J. STRAUB AND JOSEPH T. WEINZIERL, OF NEW KENSINGTON, PENNSYLVANIA

MEANS FOR PREVENTING BACK MOVEMENT IN MOTOR VEHICLES

Application filed September 7, 1927. Serial No. 217,929.

Our invention relates to improvements in means for prevention of undesirable back movement or travel of a motor vehicle under gravity, and subject to operation of the gear shift mechanism. The particular object in view is to provide means independent of such mechanism, for releasing the holding mechanism under certain conditions, as hereinafter described.

The present improvement is of the general type shown in our prior Patents No. 1,650,396 and 1,650,397 resulting from applications filed October 5, 1926, Serial #139,616, and February 24, 1927, Serial #170,509, of which this application is a continuation in part.

As shown in said patents, the non-reversing mechanism becomes inoperative only when the reversing gear is actuated to back the vehicle, reverse movement being effectively prevented at all other times.

The construction, however, makes it somewhat difficult to move the vehicle backward by pushing, as is sometimes desirable, either on the street or highway or in a garage. Without some additional releasing means other than the automatic release operated by the reverse gear, such reverse movement of the vehicle without operating the engine can only be accomplished by first shifting the transmission into reverse gear and then holding out the clutch.

Reversal under such conditions, however, requires two or more persons for the operation, and even then is difficult, because of the drag of the transmission gears and clutch which must turn while the vehicle is being pushed backward.

For these reasons, it is desirable to provide a manual release which is capable of rendering the non-reversing mechanism entirely inoperative so as to permit reverse movement of the vehicle without engine power or action. An incidental objection to such manual release is that, after it is set, it may be forgotten and the non-reversing device will then be necessarily inoperative at a time when it is needed.

Such objection has been overcome in the present improvement by so placing the release rod or handle that, when the non-reversing mechanism is rendered inoperative by the manual release, the release rod or handle will be located in such manner that it is immediately observable and cannot escape notice by the driver in taking his position for operating the vehicle.

One preferred embodiment of the invention is illustrated in the accompanying drawings, in which:

Fig. 1 is a transverse sectional view through the cam actuated tightening and holding mechanism of our former patents, and showing the manual release mechanism lowered, in operative position;

Fig. 2 is a similar view, showing the manual release mechanism in released position;

Fig. 3 is a plan view of Fig. 1;

Fig. 4 is a cross sectional view on the line IV—IV of Fig. 1.

In providing against reverse movement of the drive shaft of an automobile to hold the vehicle against gravity-induced-reverse movement under conditions not controlled by the usual brakes, and until the transmission is in low or other forward gear, we utilize the overrunning brake-controlled clutch and drum of the patents referred to.

In such construction the drum 22 of the overrunning clutch is normally gripped by the spring-tightened band or bands 33 and their lining 34 and provided with the holding terminals 35.

Said terminals are connected with the ends of the bands and extend upwardly by the bifurcated sides 36 connected by cross bolts 37 with an upper intervening slot 38.

The inner portions of sides 36 are cylindrically recessed, providing with bolts 37 clamping holding sockets for the oppositely extending shanks of the cam faced expanding lugs 39. These as shown are in shouldered engagement against the inner edges of the terminals 35 and their terminal extension sides 36 for positive expansion by the intervening spreading cam 45, when it is actuated by its lever extension 46 and link 47 connected with the reverse and low gear shifting rod 9 of the transmission.

The overrunning clutch drum 22 is provided, either in its own body portion or within a fixedly connected bushing 24, with an inner annular series of roller pockets 25.

These are of well known construction, providing a rising or binding face at one end and a widening or releasing cavity at the other, for reception of a series of co-acting rollers 26. These surround and are adapted to bind against a bushing 27 fixedly mounted on and forming a portion of the drive shaft 18 of the vehicle, as in Fig. 1. As thus arranged shaft 18 is free to rotate in the usual direction for forward driving but will be immediately locked upon reverse movement at all times that drum 22 is gripped by the brake band.

When the drum is released it is in a floating condition so that the rollers 26 will not function to bind the shaft until it is again gripped.

For effecting separation of the spring contracted brake band, its terminals 35 are pressed apart by the middle intervening opening or spreading cam 45, the opposite faces of which engage the co-acting cam faces of the expanding lugs 39.

Cam 45 is rotatably mounted on bolt 40 constituting the tightening member as acted on by the spring 43 engaging the inner one of a pair of adjustably mounted nuts 44.

Bolt 40 is preferably held against rotation by an inwardly extending lug 2 projecting into one of the slots 38 from its outer head 3. The bolt extends through the cam lugs 39 and the middle cam 45, and is mounted in a tightening bracket 4, by means of which, through lever mechanism hereinafter described, the bolt may be pushed backwardly against tightening action of spring 43, to release the brake band.

Bracket 4 is provided with an inner bearing terminal 5 engaging against the outer face of one of terminal lugs 35, as shown, and preferably having an inwardly extending holding lug 6 projecting into the other slot 38. At its outer portion, bracket 4 is provided with a cross bearing 7 and outwardly projecting bifurcated cheeks 8, between which is pivoted on pin 19 the cam lever 10.

Bolt 40 is provided at its outer end with a terminal 11 extending through bearing 7 into range of the cam face 12 of the inner end of lever 10, having the limiting stop 13, adapted to rest against the terminal 11, as in Fig. 2.

Lever 10 is provided with an operating rod 14 pivotally connected at 15, extending upwardly through floor board 16, and having a raising and lowering button 17.

In operation, rod 14 is lifted by its button, throwing cam face 12 into bearing engagement with stem 11 of bolt 40, compressing spring 43, and thereby releasing tension on the brake band, as in Fig. 2, so as to effect cessation of the holding action of the overrunning clutch. Under such conditions, the car may be freely moved backwardly during such retracted position of the binding bolt, and will so remain until the lever 10 is again lowered, as in Fig. 1.

The lifting rod 14 and its button 17 are so positioned in the vehicle as to be readily observable, and are preferably located in front of the driver's seat, whereby to give immediate notice by observation to the operator, and avoiding starting of the car until the rod is lowered for normal operation.

Thereupon, the brake band re-assumes its holding position, effecting locking of the drive shaft against gravitating back travel, while permitting operation of the car under any of the usual gear positions.

The general construction and operation of the invention will be readily understood and appreciated from the foregoing description. The equipment may be applied to the drive shaft or to the main shaft itself, and either in the rear or in front of the universal joint connecting them.

The unlocking mechanism, as shown and applied to the particular operating means for the brake band, is capable of performing its functions in the manner described, in a satisfactory and continuous manner, without liability to wear or derangement. It may, however, be utilized in connection with any equivalent means providing for tightening and loosening of any similar braking mechanism and may be also utilized in connection with any power imparting drive shaft applied otherwise than in its particular use with a motor driven vehicle.

The invention may also be variously changed or modified in various details of construction by the skilled mechanic, without departure from the scope of the following claims.

What we claim is:

1. The combination with tightening and loosening mechanism provided with separable terminals, of a bracket engaging one of the terminals, a bolt engaging the other terminal and mounted in said bracket, a retracting spring for the bolt engaging the bracket, and a lever mounted in the bracket having a cam face adapted to engage and move the bolt in opposition to the spring and provided with a limiting abutment adapted to engage the bolt.

2. In drum clamping mechanism as described, the combination with brake band terminals each having an annularly recessed bifurcated holding clamp provided with a cam faced bearing held therein, an intervening separating cam, means resiliently holding the band terminals in clamping position, means providing for separation of the band terminals consisting of a releasing bolt and a cam lever having a limiting abutment and an operating rod provided with a terminal button.

3. In drum clamping mechanism as described, the combination with brake band terminals each having an annularly recessed bifurcated holding clamp provided with a cam faced bearing held therein, an intervening separating cam, means resiliently holding the band terminals in clamping position, means providing for separation of the band terminals consisting of a releasing bolt and a cam lever having a limiting abutment and an operating rod provided with a terminal button, the operating rod extending through a guiding and supporting platform.

In testimony whereof we hereunto affix our signatures.

FRANCIS J. STRAUB.
JOSEPH T. WEINZIERL.